Patented Apr. 14, 1931

1,800,823

UNITED STATES PATENT OFFICE

GUSTAV EGLOFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS OF TREATING PETROLEUM PRODUCTS

No Drawing.   Application filed March 24, 1927.   Serial No. 178,158.

This invention relates to improvements in process of treating petroleum products, and the more specific application of the invention may be directed to the treating of gasoline, kerosene, lubricating oils and the like.

In present day practice of refining gasoline, the crude gasoline is usually subjected to a sulphuric acid treatment. This is also true of lubricating oils. This treatment produces sludge acid, which sludge acid contains more or less oily matter dispersed through the mass of sludge. Much of this sludge acid is a waste product and is generally run to a sump hole, although the acid is recovered from the sludge by more or less expensive methods, in some instances.

I have discovered that the sludge acid may be separated from the oily constituents of the sludge by subjecting the sludge to the action of a centrifuge. This centrifuge should preferably be of a character which will resist the action of the acid itself, to-wit: corrosion resistance.

In carrying out the process I may take the sludge acid from the agitator, whether of batch or continuous type, and pass the same whole, preferably at atmospheric temperature, through an acid resisting centrifuge machine. This centrifuge machine may be operated at high speeds so as to obtain a substantially complete separation of the oil or tarry matter from the acid. As the centrifugal action proceeds, the acid will be precipitated to the bottom of the centrifuge, the oily matter thrown to the top with the tarry sludge between, if any tarry matter is present. The various materials may then be separately drawn off and collected. This process effects a very substantial saving to the refiner of relatively large quantities of oil, and of course, it is obviously economical in operation. While the invention appears simple, as far as I know, no one has heretofore ever conceived of the idea that sludge acid may be recovered in the above manner, and this, despite the great desirability of saving this acid and also the oil.

I claim as my invention:—

A process of separating and recovering the acid and oil from sludge acid after separation from acid treated oil, consisting in subjecting the sludge acid free from extraneous water to the action of a centrifuge whereby the oil and acid are separated and then separately drawn off and collected.

GUSTAV EGLOFF.